3,759,791
SELECTIVE MICROBIOLOGICAL PREPARATION OF ANDROST-4-ENE-3,17-DIONE
William J. Marsheck, Arlington Heights, and Stephen Kraychy, Northbrook, Ill., assignors to G. D. Searle & Co., Chicago, Ill.
No Drawing. Filed Dec. 10, 1970, Ser. No. 96,990
Int. Cl. C07c 167/18
U.S. Cl. 195—51 G        11 Claims

ABSTRACT OF THE DISCLOSURE

A process is disclosed for preparing androst-4-ene-3,17-dione by fermenting with Mycobacterium sp. N.R.R.L. B–3805 or enzymes thereof a steroid wherein carbon atom number 17 is substituted by alkyl.

---

This invention relates to the selective microbiological preparation of androst-4-ene-3,17-dione. More particularly, this invention provides a process for preparing androst-4-ene-3,17-dione by subjecting a steroid comprising a 17-alkyl to the enzymatic activity of a species of Mycobacterium. It has long been known that certain microorganisms can metabolize steroids such as cholest-5-en-3β-ol (cholesterol) having a 17-side chain; but the metabolites which result are commonly low molecular weight compounds, not steroids. Recently it has been found (see Dutch patent application No. 6608491) that 3-oxygenated steroids having 17-side chains containing 8–10 carbons can be fermented with various oxidizing microorganisms, including a species of Mycobacterium to cleave the side chains and sometimes introduce 1,4 or 1,3,5(10) unsaturation without destroying steroidal integrity, provided the steroids are either 19-nor or oxygenated at carbon atom number 10 with hydroxyl, oxido, carboxy, aldehydo, or the like and, preferably, the microorganisms are preconditioned by cultivation in media containing a sterol such as cholest-5-en-3β-ol as the sole source of carbon. At about the same time, it was found [see Dutch patent application No. 6602662 and Steroids, 11, 401 (1968)] that steroids having carbonaceous 17-side chains can be fermented with species of Mycobacterium to produce androsta-1,4-diene-3,17-dione, provided the fermentations are carried out in the presence of an organic chelating agent such as 8-hydroxyquinoline, 2,2′ - dipyridyl, 1,10-phenanthroline, cupferron, or β-naphthol. Further, it was found (see South African patent application No. 66/6220) that androst-4-ene-3,17-dione as well as androsta-1,4-diene-3,17-dione can be produced, provided an inorganic inhibitor such as nickel, cobalt, lead, cadmium, or selenite ion is substituted for the organic chelating agent.

The utility of such processes derives from, among other things, the fact that the products produced thereby are key intermediates in the synthesis of valuable steroidal hormones. (Thus, for example, U.S. 2,143,453, 2,253,798, 2,264,888, and 2,356,154 all relate to processes for making testosterone from androst-4-ene-3,17-dione.) The process of the present invention is the more useful because it provides access to the latter intermediate from relatively cheap and readily available starting materials which need not be specially protected against undesirable attack during fermentation. No preliminary structural modification of the substrate, no inhibitory agents in the fermentation medium, nor any other comparably complicating and correspondingly costly procedural convolutions are necessary. Moreover, very little $\Delta^1$-dehydrogenation occurs, so that the single product, androst-4-ene-3,17-dione, consistently preponderates.

The microorganism thus uniquely adapted to the selective degradation of this invention is Mycobacterium sp. N.R.R.L. B–3805 available from the A.R.S. Culture Collection Investigations Fermentation Laboratory, 1815 N. University Ave., Peoria, Ill. 61604. Fermented therewith, cholest - 5 - en - 3β - ol, (24R)-methylcholest-5-en-3β-ol (campesterol), stigmast-5-en-3β-ol (β-sitosterol), stigmast-4-en-3-one (sitostenone), stigmasta-5,22-dien-3β-ol (stigmasterol), stigmasta-4,22-dien-3-one, and like steroids comprising a 17-alkyl preferably but not necessarily exclusively containing 8 or more carbons afford androst-4-ene-3,17-dione to the substantial exclusion (<10% total crude) of $\Delta^1$ products such as androsta-1,4-diene-3,17-dione and 20α-hydroxymethylpregna-1,4-dien-3-one. Other by-products present in minor amounts are 5α-androstane-3,17-dione, 5β-androstane-3,17-dione, 5α-androstane-3,6,17-trione, 9α-hydroxyandrost-4-ene-3,17-dione, and 20α-hydroxymethylpregn-4-en-3-one.

Fermentation is ordinarily carried out in the medium wherein the organism is cultured. However, it is likewise possible to separate the bacterial cells from the culture medium by centrifugation or other means and use the resultant cellular matter to implement the fermentation. Moreover, the cells can be ruptured ultrasonically or otherwise to facilitate access to enzymes present, which can be isolated by filtration or extracted with a solvent such as acetone or water and substituted for the organism or cells thereof.

A nutrient medium is required for culture of the organism, which is to say one containing assimilable nitrogen and carbon; and an adequate supply of sterile air should be maintained therein, for example by exposing a large surface of the medium to the air or preferably passing it through the medium in quantities sufficient to support submerged growth.

Suitable nitrogen sources are those normally employed for the purpose, including soy bean meal, corn steep liquor, meat extract, protein (optionally digested), peptone, yeast extract, distillers' solubles, casein hydrolysate, nitrate, and/or ammonium compounds. All of the foregoing materials excepting sometimes the last two serve also as carbon sources. Other carbon-containing substances satisfactory and conventionally used as nutrients are the carbohydrates, for example, glycerol, glucose, fructose, sucrose, lactose, maltose, inositol, dextrin, starch, and whey, among which inositol is additionally useful because of its unusual capacity to stimulate growth.

Phosphate, magnesium, and/or ferrous ions likewise may be incorporated in the culture medium as growth-promoting factors if desired; buffers may be added to assure that growth is initiated at a substantially neutral pH; and wetting agents may be employed to improve contact between the steroid and the fermenting agent. An anti-foaming agent is usually beneficial. Where isolated cells or enzymes are used to induce fermentation rather than the intact and growing organism, nutrients need not, of course, be present; but in either event the medium is customarily preponderantly aqueous.

Concentration of the steroid substrate in the medium, as also fermentation time and temperature, can vary widely; and such operating conditions are to a certain extent interdependent. A preferred but a critical range of concentrations of the substrate is 0.01–1.0%, while fermentations of from 2 hours to 10 days duration at temperatures between 24 and 35° C. are representative. Manifestly, conditions must not be so stringent as to destroy the substrate, kill the organism prematurely, or inactivate the involved enzymes.

In a preferred embodiment of the invention, a nutrient medium containing 0.1% of substrate is sterilized by heating at around 120° C. for 1 hour and then aerobically incubated at 30–32° C. with a culture of Mycobacterium sp. N.R.R.L. B–3805 for approximately 1 week. Alternatively, the substrate is introduced just prior to inoculation, or during the second or third day of incubation when the culture has developed. Products are extracted with dichloromethane and isolated by chromatography.

The following examples are directed to illustrating, variously and in detail, this invention. However, the invention is not to be construed as limited thereby, either in spirit or in scope, since it will be apparent to those skilled in the art that many modifications, both of materials and of techniques, may be practiced without departing from the purpose and intent of this disclosure.

In the examples hereinafter set forth, temperatures are given in degrees Celsius and relative amounts of materials in parts by weight, except as otherwise noted. Distribution of the substrate throughout the medium is facilitated by introducing it in the form of a suspension prepared by ultrasonically dispersing each 5 parts thereof in 200 parts of water containing 0.1 part of polyoxyethylene sorbitan monooleate (Tween 80). Foaming is controlled by adding 0.1 percent of a dimethylpolysiloxane emulsion (Dow Corning Antifoam FG 10) to the medium prior to sterilization.

Yields are calculated according to the formula $$Y = \frac{100P}{Q(S-R)}$$

where Y represents percent yield, P weight of product, Q molecular weight of product divided by molecular weight of substrate, S initial weight of substrate, and R weight of recovered substrate. Conversions are calculated according to the formula $$C = \frac{100P}{QS}$$

wherein C represents percent conversion and P, Q, and S retain the meanings previously assigned.

EXAMPLE 1

To a medium consisting of 25 parts of peptone, 15 parts of meat extract, 5 parts of yeast extract, and 5000 parts of tap water is added 5 parts of sitosterols, N.F. The resultant mixture is sterilized by heating 1 hour at 121°, whereupon it is cooled to 30±1° and then inoculated with 500 parts of a fluid culture of Mycobacterium sp. N.R.R.L. B-3805. The inoculated mixture is incubated at 30±1° for 168 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 15–20% ethyl acetate in benzene, on evaporation of solvent, a 43% yield of crude androst-4-ene-3,17-dione is obtained. Upon recrystallization from a mixture of ethyl acetate and ether, the product melts at 170–171.5°.

EXAMPLE 2

To a medium consisting of 25 parts of peptone, 15 parts of meat extract, 5 parts of yeast extract and 5000 parts of tap water is added 5 parts of stigmast-4-en-3-one. The resultant mixture is sterilized by heating 1 hour at 121°, whereupon it is cooled to 30±1° and then inoculated with 250 parts of a fluid culture of Mycobacterium sp. N.R.R.L. B-3805. The inoculated mixture is incubated at 30±1° for 240 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 15% ethyl acetate in benzene, on evaporation of solvent, a 28% yield of crude androst-4-ene-3,17-dione is obtained. Upon recrystallization from a mixture of ethyl acetate and ether, the product melts at 172–173.5°.

EXAMPLE 3

Substitution of 5 parts of stigmast-5-en-3β-ol for the sigmast-4-en-3-one called for in Example 2 affords, by the procedure there detailed, eluates comprising 20% ethyl acetate in benzene from which, on evaporation of solvent, a 37% yield of crude androst-4-ene-3,17-dione is obtained. Upon recrystallization from a mixture of acetone and ether, the product melts at 171.5–173.5°.

EXAMPLE 4

To a medium consisting of 25 parts of peptone, 15 parts of meat extract, 5 parts of yeast extract, 5 parts of i-inositol, and 5000 parts of tap water is added 5 parts of crude (24R)-24-methylcholest-5-en-3β-ol. The resultant mixture is sterilized by heating 1 hour at 121°, whereupon it is cooled to 30±1° and then inoculated with 250 parts of a fluid culture of Mycobacterium sp. N.R.R.L. B-3805. The inoculated mixture is incubated at 30±1° for 171 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 10% ethyl acetate in benzene, on evaporation of solvent and recrystallization of residual material from ether, androst-4-ene-3,17-dione melting at 171.5–173.5° is obtained in good yield. A faint trace of androsta-1,4-diene-3,17-dione is shown by thin layer chromatography to be present.

EXAMPLE 5

To a medium consisting of 25 parts of digested protein, 5 parts of yeast extract, 5 parts of i-inositol, 10 parts of disodium hydrogen phosphate heptahydrate, and 5000 parts of tap water is added 5 parts of sitosterols, N.F. The resultant mixture is sterilized by heating 1 hour at 121°, whereupon it is cooled to 30±1° and then inoculated with 250 parts of a fluid culture of Mycobacterium sp. N.R.R.L. B-3805. The inoculated mixture is incubated at 30±1° for 171 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 5–10% ethyl acetate in benzene, on evaporation of solvent and recrystallization of residual material from ether, a 38% yield of androst-4-ene-3,17-dione melting at 171–175.5° is obtained. From other eluates comprising 5% ethyl acetate in benzene, on evaporation of solvent, a 2% yield of crude 5β-androstane-3,17-dione is obtained; and from other eluates comprising 10% ethyl acetate in benzene, on evaporation of solvent and recrystallization of residual material from a mixture of ethyl acetate and ether, a 2% yield of androsta-1,4-diene-3,17-dione melting at 137–140° is obtained. From eluates comprising 20% ethyl acetate in benzene, on evaporation of solvent and recrystallization of residual material from a mixture of ethyl acetate and ether, a 0.3% yield of 20α- hydroxymethylpregna-1,4-dien-3-one melting at 175–178° is obtained.

EXAMPLE 6

Substitution of 5 parts of cholest-5-en-3β-ol for the sitosterols, N.F. called for in Example 5 and incubating for 168 hours instead of 171 affords, by the procedure there detailed, eluates comprising 5–10% ethyl acetate in benzene from which, on evaporation of solvent, a 33% yield of crude androst-4-ene-3,17-dione is obtained. Upon recrystallization from ether, the product melts at 172–174°. From other eluates comprising 10% ethyl acetate in benzene, on evaporation of solvent, a mixture of androsta-1,4-diene-3,17-dione and 20α-hydroxymethylpregn-4-en-3-one is obtained in approximately 4% yield. From eluates comprising 50% ethyl acetate in benzene, on evaporation of solvent, a 0.3% yield of crude 9α-hydroxyandrost-4-ene-3,17-dione is obtained.

EXAMPLE 7

Substitution of 5 parts of stigmasta-5,22-dien-3β-ol for the sitosterols, N.F. called for in Example 5 and incubating for 168 hours instead of 171 affords, by the procedure there detailed, eluates comprising 10% ethyl acetate in benzene from which, on evaporation of solvent and recrystallization of residual material from a mixture of acetone and ether, androst-4-ene-3,17-dione melting at 171.5–174° is obtained in good yield. From eluates comprising 15% ethyl acetate in benzene, on evaporation of solvent, a 2% yield of crude androsta-1,4-diene-3,17-dione is obtained. From eluates comprising 20% ethyl acetate in benzene, on evaporation of solvent, a mixture of 20α-hydroxymethylpregna-1,4-diene-3-one and 5α-androstane-3,6,17-trione is obtained in a yield of approximately 0.3%. From eluates comprising 50% ethyl acetate in benzene, on evaporation of solvent and recrystallization of residual material from acetone, a 0.3% yield of 9α-hydroxyandrost-4-ene-3,17-dione sintering at 181° and melting with decomposition in the range 204–211.5° is obtained.

EXAMPLE 8

Substitution of 5 parts of stigmast-4-en-3-one for the sitosterols, N.F. called for in Example 5 and incubating for 168 instead of 171 hours affords, by the procedure there detailed, eluates comprising 10% ethyl acetate in benzene from which, on evaporation of solvent and recrystallization of residual material from ether, androst-4-ene-3,17-dione melting at approximately 170.5–171.5° is obtained in good yield. From eluates comprising 15–20% ethyl acetate in benzene, on evaporation of solvent, a mixture of androsta-1,4-diene-3,17-dione and 20α-hydroxy-methylpregna-1,4-dien-3-one is obtained in <2% yield.

EXAMPLE 9

Substitution of 5 parts of crude soya residue (a mixture comprising 45–50% stigmast-5-en-3β-ol, 35–40% (24R)-24-methylcholest-5-en-3β-ol, and stigmasta-5,22-dien-3β-ol) for the sitosterols, N.F. called for in Example 5 and incubating for 216 instead of 171 hours affords, by the procedure there detailed, eluates comprising 10% ethyl acetate in benzene from which, on evaporation of solvent and recrystallization of residual material from a mixture of acetone and ether, androst-4-ene-3,17-dione melting at 169.5–171.5° is obtained in good yield. From eluates comprising 5–10% ethyl acetate in benzene, on evaporation of solvent, a 2% yield of crude 5α-androstane-3,17-dione is obtained.

EXAMPLE 10

To a medium consisting of 25 parts of soy flour, 15 parts of meat extract, 5 parts of yeast extract, 1 part of disodium hydrogen phosphate heptahydrate, 5 parts of i-inositol, and 5000 parts of tap water is added 5 parts of sitosterols, N.F. The resultant mixture is sterilized by heating 1 hour at 121°, whereupon it is cooled to 30±1° and then incubated with 250 parts of a fluid culture of Mycobacterium sp. N.R.R.L. B–3805. The inoculated mixture is inoculated at 30±1° for 216 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 10% ethyl acetate in benzene, on evaporation of solvent and recrystallization of residual material from a mixture of acetone and ether, androst-4-ene-3,17-dione melting at 171–173.5° is obtained in good yield. From eluates comprising 15% ethyl acetate in benzene, on evaporation of solvent, a 4% yield of crude androsta-1,4-diene-3,17-dione is obtained.

EXAMPLE 11

To a medium consisting of 25 parts of yeast extract, 9 parts of disodium hydrogen phosphate heptahydrate, 5 parts of i-inositol, and 5000 parts of tap water is added 5 parts of stigmast-5-en-3β-ol. The resultant mixture is sterilized by heating 1 hour at 121°, whereupon it is cooled to 30±1° and then inoculated with 250 parts of a fluid culture of Mycobacterium sp. N.R.R.L. B–3805. The inoculated mixture is incubated at 30±1° for 216 hours while sterile air is pased through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From an eluate comprising 10% ethyl acetate in benzene, on evaporation of solvent, crude androst-4-ene-3,17-dione is obtained in good yield. From eluates comprising 15% ethyl acetate in benzene, on evaporation of solvent, a 6% yield of crude androsta-1,4-diene-3,17-dione is obtained. Trace amounts of 20α-hydroxymethylpregna-1,4-dien-3-one are found in eluates comprising 20–50% ethyl acetate in benzene.

EXAMPLE 12

Prolonging the incubation time from 171 to 235 hours but otherwise duplicating the procedure of Example 5 affords eluates comprising 10% ethyl acetate in benzene from which, on evaporation of solvent, a 42% yield of crude androst-4-ene-3,17-dione is obtained. Upon recrystallization from a mixture of acetone and hexane, the product melts at 168.5–170.5°. Conversion of substrate to recrystallized androst-4-ene-3,17-dione is 33%. From other eluates comprising 10% ethyl acetate in benzene, on evaporation of solvent and recrystallization of residual material from ether, a <2% yield of androsta-1,4-diene-3,17-dione is obtained. From eluates comprising 20% ethyl acetate in benzene, on evaporation of solvent, a 1% yield of crude 5α-androstane-3,17-dione is obtained.

EXAMPLE 13

Prolonging the incubation time from 171 to 235 hours but otherwise duplicating the procedure of Example 4 affords eluates comprising 5% ethyl acetate in benzene from which, on evaporation of solvent and recrystallization of residual material from a mixture of acetone and ether, androst-4-ene-3,17-dione melting at 165.5–167.5° is obtained in good yield. Trace amounts of 20α-hydroxymethylpregna-1,4-dien-3-one are found in eluates comprising 10% ethyl acetate in benzene.

EXAMPLE 14

Substitution of 5 parts of stigmast-5-en-3β-ol for the crude (24R) - 24 - methylcholest-5-en-3β-ol called for in Example 4 and incubating for 235 instead of 171 hours affords, by the procedure there detailed, eluates comprising 10% ethyl acetate in benzene from which, on evaporation of solvent and recrystallization of residual material from a mixture of acetone and ether, a 35% yield of androst-4-ene-3,17-dione melting at 172.5–174.5° is obtained.

EXAMPLE 15

Substitution of 5 parts of stigmasta-4,22-dien-3-one for the crude (24R)-24-methylcholest-5-en-3β-ol called for in Example 4 and incubating for 168 instead of 171 hours affords, by the procedure there detailed, eluates comprising 5–10% ethyl acetate in benzene from which, on evaporation of solvent, a 14% yield of crude androst-4-ene-3,17-dione is obtained. Upon recrystallization from ether, the product melts at 169.5–171.5°.

EXAMPLE 16

A medium consisting of 2.5 parts of peptone, 1.5 parts of meat extract, 0.5 part of yeast extract, and 500 parts of water is sterilized by heating 1 hour at 121°, whereupon it is cooled to about 30° and then inoculated with 50 parts of a fluid culture of Mycobacterium sp. N.R.R.L. B–3805. The inoculated mixture is incubated at approximately 26° for 5 days while subjected to sufficient agitation to initiate and sustain aerobic submerged growth. The resultant mixture is centrifuged; and the cellular matter thus isolated is washed by suspension in 120 parts of physiological saline, again isolated by centrifugation, and finally resuspended in 30 parts of an aqueous 1.7% solution of dipotassium hydrogen phosphate adjusted to pH 7 with an aqueous 1.4% solution of potassium dihydrogen phosphate. The latter suspension is subjected to ultrasonification sufficient to rupture cell walls, whereupon soluble matter is aerobically incubated at 31° for 24 hours with 0.1 part of sterile sitosterols, N.F. Analysis via gas chromatography of a dichloromethane extract of the mixture thus obtained shows a substantial content of androst-4-ene-3,17-dione.

What is claimed is:

1. The process of preparing androst-4-ene-3,17-dione by fermenting a steroid of the cholestane or stigmastane series containing at least 8 carbons in the 17-side chain with Mycobacterium sp. N.R.R.L. B–3805 or enzymes derived therefrom.

2. The process of claim 1 wherein the steroid containing at least 8 carbons in the 17-side chain is cholest-5-en-3β - ol, (24R)-24-methylcholest-5-en-3β-ol, stigmast-5-en-3β-ol, stigmast-4-en-3-one, stigmasta-5,22-dien - 3β - ol, or stigmasta-4,22-dien-3-one.

3. The process of claim 1 wherein cholest-5-en-3β-ol, (24R)-24-methylcholest - 5 -en - 3β - ol, stigmast-5-en-3β-ol, stigmast-4-en-3-one, stigmasta-5,22-dien - 3β - ol, stigmasta-4,22-dien-3-one, or a mixture thereof is aerobically incubated with Mycobacterium sp. N.R.R.L. B–3805.

4. The process of claim 1 wherein cholest-5-en-3β-ol is aerobically incubated with Mycobacterium sp. N.R.R.L. B–3805 in a nutrient medium to produce androst-4-ene-3,17-dione.

5. The process of claim 1 wherein (24R)-24-methylcholest-5-en-3β-ol is aerobically incubated with Mycobacterium sp. N.R.R.L. B–3805 in a nutrient medium to produce androst-4-ene-3,17-dione.

6. The process of claim 1 wherein stigmast-5-en-3β-ol is aerobically incubated with Mycobacterium sp. N.R.R.L. B–3805 in a nutrient medium to produce androst-4-ene-3,17-dione.

7. The process of claim 1 wherein stigmast-4-en-3-one is aerobically incubated with Mycobacterium sp. N.R.R.L. B–3805 in a nutrient medium to produce androst-4-ene-3,17-dione.

8. The process of claim 1 wherein stigmasta-5,22-dien-3β-ol is aerobically incubated with Mycobacterium sp. N.R.R.L. B–3805 in a nutrient medium to produce androst-4-ene-3,17-dione.

9. The process of claim 1 wherein stigmasta-4,22-dien-3-one is aerobically incubated with Mycobacterium sp. N.R.R.L. B–3805 in a nutrient medium to produce androst-4-ene-3,17-dione.

10. The process of claim 1 wherein a mixture of (24R)-24-methylcholest-5-en-3β-ol and stigmast-5-en-3β-ol is aerobically incubated with Mycobacterium sp. N.R.R.L. B–3805 in a nutrient medium to produce androst-4-ene-3,17-dione.

11. The process of claim 1 wherein a mixture of (24R)-24-methylcholest-5-en-3β-ol, stigmast-5-en-3β-ol, and stigmasta-5,22-dien-3β-ol is aerobically incubated with Mycobacterium sp. N.R.R.L. B–3805 in a nutrient medium to produce androst-4-ene-3,17-dione.

References Cited
UNITED STATES PATENTS

| | | | |
|---|---|---|---|
| 3,388,042 | 6/1968 | Arima et al. | 195—51 G |
| 3,507,749 | 4/1970 | Sih | 195—51 G |
| 3,476,779 | 11/1969 | Vezina et al. | 195—51 G |
| 3,684,657 | 8/1972 | Kraychy et al. | 195—51 G |

ALVIN E. TANENHOLTZ, Primary Examiner